United States Patent

Jones et al.

Patent Number: 5,126,405
Date of Patent: Jun. 30, 1992

[54] CROSS-LINKED CONDUCTIVE POLYMERS AND ANTISTAT COATINGS EMPLOYING THE SAME

[75] Inventors: Raymond T. Jones, Webster; Charles C. Anderson, Rochester, both of N.Y.

[73] Assignee: Eastman Kodak Company, Rochester, N.Y.

[21] Appl. No.: 527,409

[22] Filed: May 23, 1990

[51] Int. Cl.$^5$ .............................. C08F 8/00
[52] U.S. Cl. ................. 525/100; 525/328.5; 525/370
[58] Field of Search ............ 525/100, 370, 328.5

[56] References Cited

U.S. PATENT DOCUMENTS

| | | | |
|---|---|---|---|
| 4,041,001 | 8/1977 | Szymanski et al. | 260/29.6 |
| 4,043,952 | 8/1977 | Ganslaw et al. | 525/353 |
| 4,225,665 | 9/1980 | Schadt, III | 430/529 |
| 4,293,606 | 10/1981 | Zollinger et al. | 428/203 |
| 4,582,782 | 4/1986 | Valsecchi | 430/527 |
| 4,668,748 | 5/1987 | Hardam et al. | 526/240 |
| 4,741,992 | 5/1988 | Przezdziecki | 430/523 |
| 5,013,637 | 5/1991 | Tsukada . | |

Primary Examiner—Bernard Lipman
Attorney, Agent, or Firm—Robert A. Gerlach

[57] ABSTRACT

Crosslinked conductive polymers, coating compositions and light sensitive elements containing at least one antistat layer where the cross-linked polymer is a copolymer of a vinylbenzene sulfonic acid and an ethylenically unsaturated monomer containing at least one primary hydroxyl group cross-linked with a hydrolyzed metal lower alkoxide.

20 Claims, No Drawings

CROSS-LINKED CONDUCTIVE POLYMERS AND ANTISTAT COATINGS EMPLOYING THE SAME

BACKGROUND OF THE INVENTION

1. Field of the Invention

This invention relates to cross-linked conductive polymers and more particularly to antistat layers employing the cross-linked conductive polymers. Additionally, the invention relates to light sensitive elements having at least one antistat layer.

2. Description of Related Art

Schadt, U.S. Pat. No. 4,225,665, discloses an antistatic composition for photographic films wherein a conductive polymer having carboxyl groups and a hydrophobic polymer containing carboxyl groups are cross-linked with a polyfunctional aziridine.

Hardam et al, U.S. Pat. No. 4,668,748, discloses a cross-linkable conductive copolymer of a monomer of sodium styrene sulfonate type and a vinyl amine monomer.

Because of the electrostatic charges that build up on polymeric articles as they move in contact with other surfaces of high dielectric constant, it has been necessary to provide a conductive layer on polymeric articles in order to prevent the build up of charges. This problem is particularly acute in photographic applications, both during the preparation thereof and during use and development, because during the preparation it is undesirable to have static discharge that will expose localized areas of the light sensitive recording media. Subsequently, both during the exposure cycle and the development cycle, static charges are unwanted because they attract dirt and dust particles which appear as imperfections in the final presentation of the developed image, whether it be in the form of a print or projected image. The two patents mentioned above, provide antistatic properties during the preparation and subsequently during processing of the film and are for that reason defined as having permanent antistat properties.

It is also desirable to provide antistat coatings for light sensitive elements wherein in addition to serving as antistat layers generally, such as subbing layers for subsequently applied layers in the recording element, that the antistat layer also serves as an overcoat layer. When serving as an overcoat, it is desirable that the layer also provide the recording element a measure of protection with regard to abrasion. Abrasion is an ever present problem in photographic films, particularly because in all stages of its preparation, use and development, the film encounters other objects such as rollers and the like. Indeed in motion picture film, for example, the film is constantly moved passed a variety of elements in the projection apparatus which can cause imperfections as a result of contact therewith. Further, as the film is utilized in projection apparatus, it attracts dust particles from the environment which when projected become enlarged. It is desirable to remove such particles and therefore it is necessary that the film have a measure of abrasion resistance in order to withstand brushing or the like to accomplish this purpose.

It is therefore desirable to provide an antistat layer in a photographic element that not only is of the proper conductivity to prevent the build up of electrostatic charges but also one which will withstand the various forces applied to the surface of the particular photographic element.

SUMMARY OF THE INVENTION

The invention is directed to cross-linked conductive polymers, to coating compositions thereof and to light sensitive elements containing at least one antistat layer of a copolymer of (1) an ammonium or alkali metal salt of a vinyl benzene sulfonic acid and (2) an ethylenically unsaturated monomer containing at least one primary hydroxyl group cross-linked with a hydrolyzed metal lower alkoxide. The invention also contemplates coatings of such cross-linked polymers particularly coatings employed as antistatic layers in light-sensitive recording elements such as photographic films wherein the coatings are utilized as overcoats, subbing and backing layers to reduce fog caused by static discharges during manufacturing, customer use and the like.

DETAILED DESCRIPTION OF THE INVENTION

The invention thus contemplates conductive cross-linked polymers containing a water soluble electrically conductive addition polymer having functionally attached hydroxyl groups and being a copolymer of an alkali metal or ammonium salt of a vinyl benzene sulfonic acid and an ethylenically unsaturated monomer containing at least one primary hydroxyl group where this conductive polymer is cross-linked by reaction with a hydrolyzed metal lower alkoxide. Optionally, and preferably, the invention contemplates cross-linked polymers wherein in addition to the conductive addition polymer and the metal alkoxide cross-linking agent, the composition includes a hydroxyl containing binder polymer which provides resiliency to the antistat layers.

Thus, the invention contemplates not only the cross-linked polymers prepared utilizing the components indicated above, but also contemplates aqueous solutions or dispersions of the conductive addition polymer, an hydroxyl containing binder polymer which is water soluble or water dispersible and a metal alkoxide cross-linking agent.

In the preparation of the water soluble electrically conductive addition polymers having functionally attached hydroxyl groups, any suitable ammonium or alkali metal salt of a vinyl benzene sulfonic acid may be used such as for example, sodium styrene sulfonate, ammonium styrene sulfonate, potassium styrene sulfonate, lithium styrene sulfonate, vinyl monoalkyl substituted benzene sulfonates, such as, for example, the ammonium, sodium, potassium or lithium salts of the following: vinyl toluene sulfonic acid, vinyl ethylbenzene sulfonic acid, vinyl n-propylbenzene sulfonic acid, vinyl isopropylbenzene sulfonic acid, vinyl n-butyl benzene sulfonic acid, vinyl tert-butyl benzene sulfonic acid, vinyl isobutyl benzene sulfonic acid, vinyl isopentyl benzene sulfonic acid, vinyl 3-methylbutyl benzene sulfonic acid, vinyl n-hexyl benzene sulfonic acid, vinyl isohexyl benzene sulfonic acid and the like. It is preferred that the alkyl group of the substituted vinylbenzene sulfonate have from 1-6 carbon atoms.

In the preparation of the water soluble electrically conductive polymer, any suitable compound containing an ethylenically unsaturated double bond capable of forming an addition polymer with the vinyl benzene sulfonate compound and containing at least one primary hydroxyl group may be employed such as for example, hydroxy ethylmethacrylate, hydroxy ethylacrylate, hydroxy n-propylmethacrylate, hydroxy n-butylacrylate, hydroxy containing acrylamides such as, N- methylol acrylamide, N-ethanol acrylamide, dihydroxyethylmaleate, vinylbenzyl alcohol and the like. The benzene sulfonate and the ethylenically unsaturated hydroxyl containing compound are employed in ratios varying from 95:5 to 15:85. Preferably the hydroxyl containing compound should be present in at least 25 mole percent and most preferably from about 25 to about 50 mole percent. It is necessary that sufficient hydroxyl groups be present on the addition polymer in order to achieve the desired level of cross-linking when reacted with the hydrolyzed metal lower alkoxide. Thus, when ethylenically unsaturated compounds containing more than a single hydroxyl group are employed, the molar amount of ethylenically unsaturated compound containing hydroxyl groups may be lowered. Further, it is also necessary that this copolymer contain sufficient sulfonate groups to provide the cross-linked polymer with sufficient conductivity for the specific application for which the conductive polymer is to be used. Thus, it may be necessary to modify the quantities of the two ingredients of the copolymer to achieve the proper balance of cross-link sites and salt groups.

When a binder polymer is to be employed in the preparation of the conductive polymers in accordance with this invention, any suitable hydroxyl containing solution or latex polymer may be employed such as for example, polyvinyl alcohol, polyhydroxy ethylacrylate, polyhydroxyethylmethacrylate, polyhydroxypropylacrylate or methacrylate, polyhydroxyethylcellulose, polyhydroxylpropylcellulose, N-methylol acrylamide gelatin, polyhydroxyl ethyl acrylamide, water soluble cellulose acetate and the like. The presence of a hydroxyl containing binder polymer is preferred as the antistat layers are less brittle. It is further preferred that the binder polymer be employed in an amount of from about 20% to about 50% by weight of the coating composition to achieve abrasion resistance and permanency of the antistatic properties.

As cross-linking agents, any suitable hydrolyzed metal lower alkoxide may be employed such as for example, tetraethylorthosilicate, tetrabutylorthosilicate, tetraethylorthotitinate, tetrabutylorthotitinate, methytriethoxysilane, methyltriethylorthotitinate, phenyltriethoxysilane phenyltriethylorthotitinate, tetrapropoxysilane, and the like. In addition to the metal alkoxides set forth above, the alkoxides of metals such as germanium, aluminum, zirconium, boron, tin and the like may be employed. In addition, mixtures of any of the above metal lower alkoxides may be employed as cross-linking agents in accordance with this invention. The cross-linking agent should be employed in an amount of from about 20 to about 75 percent by weight depending upon the degree of cross-linking desired in the final coated layer. The cross-linking agent is preferably used in an amount of from about 25 to about 50 percent by weight.

In the preparation of coating compositions for application to any type of support to which antistatic properties are to be imparted, the conductive polymer, the cross-linking agent and the binder polymer, if one is to be employed, is dissolved or suspended in an aqueous medium. Surfactants may also be added to facilitate solution or dispersion or as a coating aid. Suitable surfactants include sodium lauryl sulfonate, dioctyl sodium sulfosuccinate, sodium octylphenylpolyether sulfonate, saponin and the like.

The coating compositions, in accordance with the above, may be applied in any suitable location with respect to the type of photographic film desired. The antistatic coatings in accordance with this invention are suitable for all types of light sensitive recording elements including commercial photographic film, graphic arts films, x-ray films, microfilm, electrophotographic elements and the like. Any suitable photographic support may be employed such as for example, polyethyleneterephthalate, cellulose ester including cellulose diacetate, cellulose triacetate, polycarbonate paper, resin coated paper and the like. The coating compositions may be applied directly to one surface of the support or it may be applied to the surface of any other layer of the photographic element. It may be desirable, prior to applying the coating composition to subject the underlying surface to corona discharge treatment in accordance with techniques known in the art. The antistatic layer may be applied either above or beneath a photosensitive layer such as a gelatin layer containing silver halide or the like. Subbing layers suitable for promoting adhesion of the various layers may be employed in accordance with the common knowledge known in the art especially that taught in U.S. Pat. Nos. 2,678,235; 2,627,088; 2,703,290; 2,794,742; 2,852,378 and 2,943,937.

The compositions in accordance with this invention may be applied in any suitable coverage based on the dry weight of the composition and preferably in a coverage of from about 5 to about 200 milligrams per square foot depending upon the type of layer being applied. For a subbing layer the coverage preferably should be about 5 to 50 milligrams per square foot, for a backing layer from about 25 to 200 milligrams per square foot. Subsequent to application in the given location with respect to the structure of the light sensitive recording element, the antistat layer is subjected to drying and curing which transforms the aqueous coating composition into a permanent antistat layer which is a highly abrasion resistant, water resistant transparent layer. In the curing of the antistat layer, temperatures of from about 25° C. to about 200° C. may be employed. Preferably a temperature from about 80° C. to 140° for approximately 3 to 10 minutes is employed.

The conductive cross-linked polymer coatings in accordance with this invention provide extremely good protection against the occurrence of electrostatic charges on the film in addition to providing abrasion resistant coatings: thereby serving the dual purpose of an antistat coating and a protective overcoat.

The invention will be further illustrated by the following examples:

EXAMPLE 1—PREPARATION OF CONDUCTIVE POLYMER

A solution of 10 grams of sodium styrene sulfonate, 10 grams of hydroxyethylmethacrylate and 0.1 gram sodium persulfate and 180 grams of distilled water is placed in a flask equipped with a condenser. The solution is sparged with nitrogen for 30 minutes and then heated in an oil bath maintained at 90° C. for 20 hours. The solution is cooled to room temperature to yield approximately 99% conversion to a copolymer with a molar ratio of 4:6 sodium styrene sulfonate to hydroxyethylmethacrylate.

EXAMPLE 2—PREPARATION OF A SUBBING LAYER COATING

The composition prepared in Example 1 is diluted to a 2% solids solution in water. Seventy grams of this solution are mixed with 30 grams of a 2% solids solution in water of a terpolymer of n-butylacrylate/acrylic acid/hydroxyethylmethacrylate (70/10/15), 5 grams of a 16.3% by weight solution in water of hydrolyzed tetraethylorthosilicate and 1 grams of a 10% by weight aqueous solution of a surfactant sold under the trade designation Olin 10G. This formulation is coated with a doctor blade onto a polyethylene terephthalate film base previously coated with an adhesion promoting coating of poly(acrylonitrile vinylidene chloride-acrylic acid) latex. The sample is dried for 5 minutes at 100° C. to give an antistatic layer with a dry weight of 50 milligrams per square foot. This antistat coating exhibits a surface resistivity, measured as log ohm/per sq, at 30% relative humidity after immersion in 95° F. water for 0 minutes, 0.5 minutes, 1 minute, 3 minutes and 5 minutes as 9.3, 9.6, 9.1, 9.4 and 9.5, respectively.

EXAMPLE 3–PREPARATION OF BACKING LAYERS

A 3% solids aqueous coating solution is prepared from equal parts by weight of polyvinyl alcohol, a conductive addition polymer of 90 weight percent sodium styrene sulfonate and 10 weight percent of hydroxyethylmethacrylate and an 85/15 mole percent mixture of hydrolyzed tetraethylorthosilicate and hydrolyzed tetrabutylorthotitinate. Zonyl FSN, a fluorinated surfactant sold by DuPont, is added at a concentration of 0.05%. Hand coatings are made with a wire wound rod at a dry coverage of 100 milligrams/square foot on a polyethylene terephthalate polyester support previously coated with a subbing layer as in Example 2. The coating composition is dried at 260° F. Surface resistivity of the coatings is measured at 20 and 50 percent relative humidity both before and after processing in normal film processing solutions. This data is presented in Table I. Paper clip friction (PCF), single arm scratch (SAS) and Taber abrasion are also measured and reported in Table II. These three test methods are conducted in accordance with the procedures set forth in ANSI IT 9.4-1988, ANSI PH 1.37-1977 and ASTM D1044, respectively.

EXAMPLE 4

Example 3 is repeated with the exception that the cross-linking agent employed is a mixture of 10 mole percent of hydrolyzed methyl triethoxysilane, 75 mole percent of hydrolyzed tetraethylorthosilicate and 15 mole percent of tetrabutylorthotitinate. The results with regard to surface resistivity and paper clip friction, single arm scratch and Taber abrasion are set forth in Tables I and II, respectively.

EXAMPLE 5

The procedure of Example 3 is once again repeated with the exception that the cross-linking agent is a mixture of 10 mole percent of hydrolyzed phenyltriethoxy silane, 75 mole percent of hydrolyzed tetraethylorthosilicate and 15 mole percent of tetrabutylorthotitinate. The results of this Example are also set forth in Tables I and II, respectively.

TABLE I

| | Surface Resistivity, log ohm/sq | | | |
|---|---|---|---|---|
| | Before Processing | | After Processing | |
| Example No. | 20% RH | 50% RH | 20% RH | 50% RH |
| 3 | 10.3 | 9.1 | 12.6 | 10.6 |
| 4 | 10.1 | 9.0 | 12.7 | 10.5 |

TABLE I-continued

| | Surface Resistivity, log ohm/sq | | | |
|---|---|---|---|---|
| | Before Processing | | After Processing | |
| Example No. | 20% RH | 50% RH | 20% RH | 50% RH |
| 5 | 10.2 | 8.9 | 12.8 | 10.5 |

TABLE II

| Example No. | Paper Clip Friction | Single Arm Scratch (gms) | Taber Abr. (% haze) |
|---|---|---|---|
| 3 | 0.35 | 45 | 3.5 |
| 4 | 0.30 | 50 | 3.9 |
| 5 | 0.32 | 45 | 4.0 |

In each of the following nine examples, the general procedure indicated in Example 3 is followed. In each of these examples hydrolyzed tetraethylorthosilicate is utilized as the cross-linking agent, polyvinyl alcohol is used as a binder polymer and a copolymer of sodium styrene sulfonate and hydroxyethylmethacrylate is employed as the conductive copolymer. In the case of the conductive copolymer the mole percent of the ingredients is varied as set forth with particularity in each Example. The weight ratios of the various three components are also indicated in each specific Example. In each case the coverage of the antistat layer on a polyethylene terephthlate support layer having a subbing intermediate layer is 120 milligrams per square foot. The test results are set forth in Table III.

EXAMPLE 6

In this Example, sodium styrene sulfonate is employed in an amount of 90 mole percent and hydroxyethylmethacrylate 10 pole percent. The weight ratio of polyvinyl alcohol/tetraethylorthosilicate/conductive polymer is 1/1/2.

EXAMPLE 7

In this Example, sodium styrene sulfonate is employed in an amount of 90 mole percent and hydroxyethylmethacrylate 10 pole percent. The weight ratio of polyvinyl alcohol/tetraethylorthosilicate/conductive polymer is 1/1/1.

EXAMPLE 8

In this Example, sodium styrene sulfonate is employed in an amount of 90 mole percent and hydroxyethylmethacrylate 10 pole percent. The weight ratio of polyvinyl alcohol/tetraethylorthosilicate/conductive polymer is 0.5/1/1.

EXAMPLE 9

In this Example, sodium styrene sulfonate is employed in an amount of 90 mole percent and hydroxyethylmethacrylate 10 pole percent. The weight ratio of polyvinyl alcohol/tetraorthosilicate/conductive polymer is 0.25/1/1.

EXAMPLE 10

In this Example, the ratio of sodium styrene sulfonate to hydroxyethylmethacrylate on a molar ratio basis is 60/40. The weight ratio of polyvinyl alcohol/tetraethylorthosilicate/conductive polymer is 1/1/2.

EXAMPLE 11

The same conditions as utilized in Example 10 are employed herein with the exception that the three ingredients are present in a weight ratio of 1/1/1.

EXAMPLE 12

The same conditions as utilized in Example 10 are employed herein with the exception that the three ingredients are present in a weight ratio of 1/1/0.5.

EXAMPLE 13

In this Example, the conductive polymer is a copolymer of 70 mol percent sodium styrene sulfonate and 30 mol percent hydroxylethylmethacrylate. The three ingredients, that is, polyvinyl alcohol/hydrolyzed tetraethylorthosilicate/conductive polymer are employed in a weight ratio of 1/1/2.

EXAMPLE 14

The exact procedure of Example 13 is followed with the exception that the three ingredients are employed in a weight ratio of 1/1/1.

As indicated above, the properties of these coatings is set forth in the following Table III.

TABLE III

| Example No. | PCF | SAS | Taber | Rs 45% RH Log Ohms Processing Before | After |
|---|---|---|---|---|---|
| 6 | 0.48 | 55 | 5.9 | 8.2 | 8.5 |
| 7 | 0.36 | 45 | 2.8 | 9.0 | 9.1 |
| 8 | 0.41 | 30 | 5.2 | 9.4 | 9.3 |
| 9 | 0.32 | 40 | 11.7 | 9.2 | 8.6 |
| 10 | 0.43 | 50 | 5.1 | 8.6 | 9.0 |
| 11 | 0.40 | 30 | 2.0 | 10.0 | |
| 12 | 0.46 | 40 | 2.7 | 12.3 | |
| 13 | 0.37 | 50 | 6.3 | 8.3 | 8.4 |
| 14 | 0.47 | 40 | 3.0 | 9.2 | 9.9 |

It should be understood that any of the hydroxyl containing binder polymers enumerated above, any of the hydrolyzed metal alkoxides and any conductive polymer as indicated may be employed throughout the working examples set forth above in like quantities to achieve comparable results without departing from the spirit of this invention.

What is claimed is:

1. A conductive cross-linked polymer comprising the reaction product of a water-soluble electrically conductive polymer having functionally attached hydroxyl groups and from about 20 percent to about 75 percent by weight of a hydrolyzed silicon lower alkoxide or hydrolyzed metal lower alkoxide, the water-soluble electrically conductive polymer being an addition product of (1) from 15 to 95 mol percent of an ammonium or alkali metal salt of a vinylbenzene sulfonic acid and (2) from 5 to 85 mol percent of an ethylenically unsaturated monomer containing at least one primary hydoxyl group.

2. The conductive cross-linked polymer of claim 1 wherein from about 20 to about 50 percent by weight of a water soluble or water dispersible hydroxyl containing binder polymer is present.

3. The conductive cross-linked polymer of claim 1 wherein the water-soluble electrically conductive polymer contains from about 25 to about 50 mol percent of hydroxyl containing moieties.

4. The conductive cross-linked polymer of claim 1 wherein the vinylbenzene sulfonic acid is styrene sulfonic acid.

5. The conductive cross-linked polymer of claim 1 wherein a hydrolyzed silicon lower alkoxide is employed.

6. The conductive cross-linked polymer of claim 2 wherein a hydrolyzed silicon lower alkoxide is employed.

7. The conductive cross-linked polymer of claim 2 wherein the hydrolyzed silicon lower alkoxide or hydrolyzed metal lower alkoxide is present in an amount of from about 25 to about 50 percent by weight.

8. The conductive polymer of claim 2 wherein the hydroxyl containing binder polymer is water soluble.

9. The conductive polymer of claim 2 wherein the hydroxyl containing binder polymer is water dispersible.

10. The conductive cross-linked polymer of claim 1 wherein the salt of a vinylbenzene sulfonic acid is an alkali metal salt.

11. A coating composition for applying an electrically conducting layer to a surface of a light sensitive element which comprises a water soluble electrically conductive polymer having functionally attached hydroxyl groups and from about 20 percent to about 75 percent by weight of a hydrolyzed silicon lower alkoxide or hydrolyzed metal lower alkoxide, the water soluble electrically conductive polymer being an addition product of (1) from 15 to 95 mol percent of an ammonium or alkali metal salt of a vinylbenzene sulfonic acid and (2) from 5 to 85 mol percent of an ethylenically unsaturated monomer containing at least one primary hydroxyl group.

12. The coating composition of claim 11 wherein from about 20 to about 50 percent by weight of a water soluble or water dispersible hydroxyl containing binder polymer is present.

13. The coating composition of claim 11 wherein the water soluble conductive polymer contains from about 25 to about 50 mol percent hydroxyl groups.

14. The coating composition of claim 11 wherein the vinyl sulfonic acid is styrene sulfonic acid.

15. The coating composition of claim 11 wherein a hydrolyzed silicon lower alkoxide is employed.

16. The coating composition of claim 12 wherein a hydrolyzed silicon lower alkoxide is employed.

17. The coating composition of claim 12 wherein the hydrolyzed silicon lower alkoxide or hydrolyzed metal lower alkoxide is present in an amount of from about 25 to about 50 percent by weight.

18. The coating composition of claim 12 wherein the hydroxyl containing binder polymer is water soluble.

19. The coating composition of claim 12 wherein the hydroxyl containing binder polymer is water dispersible.

20. The coating composition of claim 11 wherein the salt of a vinylbenzene sulfonic acid is an alkali metal salt.

* * * * *